Oct. 1, 1940.                H. B. HEDMARK                2,216,346
                     THERMOSTATICALLY OPERATED VALVE
                           Filed Jan. 13, 1938
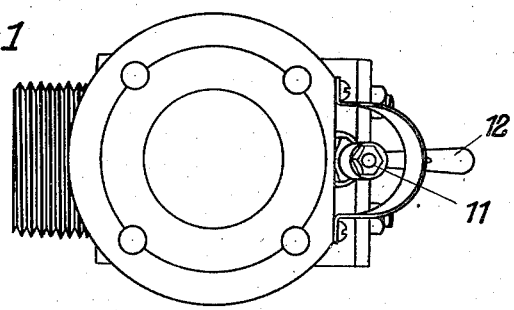
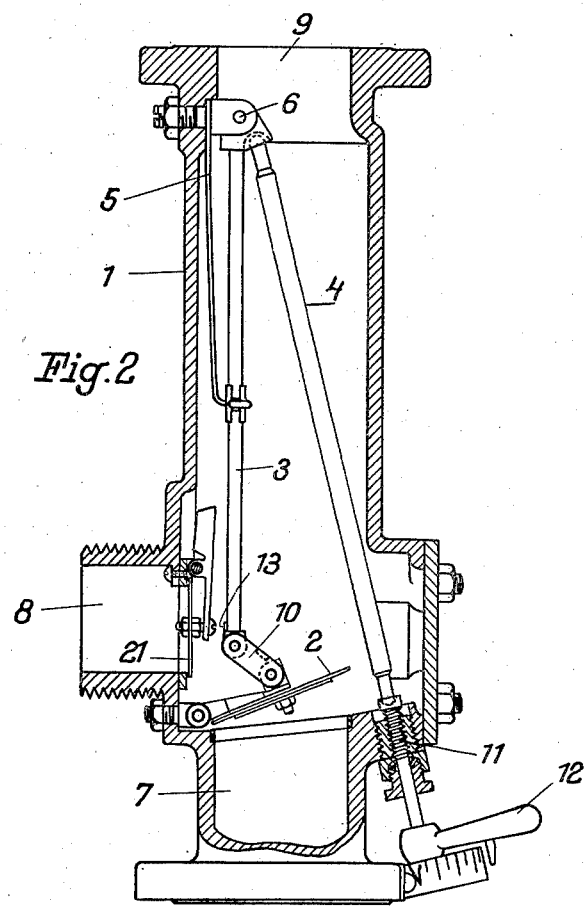
Inventor:
Henning Basilius Hedmark Patented Oct. 1, 1940

2,216,346

UNITED STATES PATENT OFFICE 2,216,346

THERMOSTATICALLY OPERATED VALVE

Henning Basilius Hedmark, Hedemora, Sweden

Application January 13, 1938, Serial No. 184,770

1 Claim. (Cl. 236—12)

The present invention relates to an automatically acting valve for regulating the mixing of hot and cold media more particularly in connection with hot water or steam boilers.

The present invention relates to an automatically-acting temperature-regulating bleeding valve or other shunt arrangement or device, which is installed in the rising piping. The valve thus installed is also adapted to act as a non-return valve for the return pipes.

The invention will be hereinafter described with reference to the drawing, which shows a constructional form of the invention by way of example.

Fig. 1 of the drawing shows an end view, and
Fig. 2 shows a section through a regulating and shunt valve.

As can be clearly seen from Fig. 2, the body of the valve 1, is provided with a flanged connection to the boiler. A connection 8 to the return pipes from the heat radiators is also provided on the side of the valve as shown in Fig. 2, and at the upper end of the valve a flanged connection 9 serves to connect the valve to the risers.

A disc or other valve 2 is arranged in the lower opening of the connection 7 and is regulated by means of the rod 3, which in turn is acted upon in part by the thermostat 4, capable of great elongation, and in part by an elastic or resilient spring arrangement 5. The thermostat 4 is mounted in an inclined position across the valve body or housing 1, so that it is always completely surrounded by both hot and cold media.

The rod 3 is pivoted on the pin 6, and transmits its movement to the disc valve 2 by means of a link 10. The rod 3 is also provided with a striker 13, or the like, which, when the valve 2 opens causes the non-return valve 21 to close the connection 8 to the return pipes. The thermostat 4 can be adjusted by a screw 11 actuated by a handle 12.

When in communication with the cold water reservoir the valve 2 is fully open, whereby the abutment 13 on the rod 3 closes the non-return valve 21 against the connection 8, thus causing the water to circulate through the valve 2 and the connection 9 to the risers, whereupon the thermostat 4 acts upon the valve 2, and the temperature of the water in the cold water reservoir rises, whilst at the same time the striker 13 on the rod 3 is freed from the valve 21 so providing communication in the riser and return pipes. This permits the current from the return water reservoir, to mix with the hot water from the boiler, until a temperature is reached, which is determined by the adjustment of the thermostat 4 by the aid of the screw 11 and the handle 12. The circulation is now in full action, the temperature of the system being regulated within the desired limits by the regulating means no matter how many radiators are in circuit or what the temperature of the boiler may be.

I claim:

A thermostatically operated valve for regulating the mixing of hot and cold media comprising a housing, means for connecting said housing to a pipe system, means for connecting said housing to a heating apparatus, a longitudinal passage through said housing, a valve for controlling fluid from the heating apparatus, a rod member for operating said valve, a lug in the housing, a pivotal member carried by said lug, one end of said rod member being carried by said pivotal member, a link member connecting the other end of said rod member with said controlling valve, a spring member controlling said rod member, an inclined thermostatic rod, at one end connected with said pivotal member, screw means for adjusting said thermostatic rod, a handle for operating said screw means, a lateral opening in the housing for connection to return pipes, a non-return valve in said opening, an abutment on said non-return valve, and an abutment on said rod member coacting therewith for operating said non-return valve.

HENNING BASILIUS HEDMARK.